United States Patent [19]
Hodge et al.

[11] 3,952,299
[45] Apr. 20, 1976

[54] DATA LINE CORRELATOR

[75] Inventors: Winston W. Hodge, Orange; David Rosenstock, Norco, both of Calif.

[73] Assignee: Rockwell International Corporation, El Segundo, Calif.

[22] Filed: July 28, 1969

[21] Appl. No.: 845,366

[52] U.S. Cl............................ 343/5 MM; 235/181; 340/146.3 Q
[51] Int. Cl.² ...................... G01S 7/04; G01S 9/00; G06K 9/00
[58] Field of Search................. 235/181; 340/146.3, 340/146.3 Q, 146.3 H; 343/5 MM

[56] References Cited
UNITED STATES PATENTS

| | | | |
|---|---|---|---|
| 2,964,639 | 12/1960 | Holbrough | 343/5 MM |
| 2,989,890 | 6/1961 | Dressler | 343/5 MM |
| 3,196,395 | 7/1965 | Clowes | 340/146.3 Q |
| 3,292,149 | 12/1966 | Bourne | 340/146.3 H |
| 3,299,425 | 1/1967 | Smith et al. | 343/5 MM |
| 3,398,269 | 8/1968 | Williams | 340/146.3 Q |
| 3,441,724 | 4/1969 | Taylor | 235/181 |
| 3,492,469 | 1/1970 | Silverman | 235/194 |
| 3,553,690 | 1/1971 | Spangler | 343/5 MM |

*Primary Examiner*—Maynard R. Wilbur
*Assistant Examiner*—H. A. Birmiel
*Attorney, Agent, or Firm*—H. Fredrick Hamann; Rolf M. Pitts

[57] ABSTRACT

A line correlator for use as a pattern matching device in a high resolution radar system. Binary coded a priori target area information is digitally correlated with binary coded video range trace signals for a plurality of range and azimuth sets in parallel or multiplexed channels (representing an area of interest), the quantitative correlation for each set being stored. Upon determination of the comparatively better correlation coefficient, the associated range and azimuth data set are retrieved and may be employed for terminal guidance purposes.

11 Claims, 11 Drawing Figures

DATA LINE CORRELATOR

CROSS-REFERENCES TO PENDING APPLICATIONS

1. U.S. application Ser. No. 686,113, filed Nov. 28, 1967, by C. L. Vehrs, Jr., for A TIME DOMAIN CORRELATOR FOR SPATIAL FILTERING IN A PULSED ENERGY SYSTEM.

BACKGROUND OF THE INVENTION

The field of the invention relates to correlation of a data matrix of interest with a data reference for image matching or matrix location purposes.

In the field of information-handling or data storage and retrieval, it is often convenient to represent a body of related data relevant to a subject or parameter of interest, as a two-dimensional data matrix, in which a first variable corresponding to the state of the parameter of interest is indicated as a function of two other related parameters, represented as two mutually orthogonal dimensions defining the plane of the data matrix. Such parameter of interest may represent an intensity or magnitude which varies as a function of position in a plane or selected area. The parameter may even be only two-state or binary coded such as, for example, a black and white image.

In the field of data correlation or image matching, the prior art has endeavored to compare the image of an area or matrix of interest with a reference image or matrix which has involved the testing and correlation of each of the data elements of the data matrix of interest over the entire reference matrix. Such a technique requires a large amount of data processing capacity in terms of computer hardware, software, or both, and may require substantial processing time. The required processing capacity and time, of course, are increased as the size of the data matrix is increased or the desired image resolution improved. A view of such prior art spatial discrimination techniques is described in U.S. Pat. No. 3,444,380.

The process of image matching has a number of potential uses, such as in the matching of ground-mapping radar data with a reference map for terminal guidance purposes. The ability to automatically perform such a function removes the element of human skill in performing such function, as to allow such terminal guidance procedure for unmanned vehicles. However, the necessary data processing capacity and speed required for such a mission have been difficult to achieve in a limited equipment package which is useful and practical for airborne applications.

SUMMARY OF THE INVENTION

By means of the concept of the subject invention, there is provided correlation means useful for image matching purposes and which requires less data processing capacity to efficiently effect the data correlation function.

In a preferred embodiment of the invention, there is provided a line correlator for use as a pattern matching device in a high resolution radar system. Binary coded a priori target area information is digitally correlated with binary coded video range trace signals for a plurality of range and azimuth sets in parallel or multiplexed channels (representing an area of interest), the quantitative correlation for each set being stored. Upon determination of the comparatively better correlation coefficient, the associated range and azimuth data set are retrieved and may be employed for terminal guidance purposes.

In normal operation of the correlator, the correlation coefficient $M(\tau, \theta)$ is determined for the correlation of the data matrix and the data reference in accordance with the following relationship:

$$M(\tau, \theta) = \left[ \frac{LN(11) - N_R(1)N_S(1)}{\sqrt{N_S(1)N_S(0)N_R(1)N_R(0)}} \right]^n \quad (1)$$

where:
$N(11)$ = number of matched 1's
$N_R(1)$ = number of 1's in reference
$N_R(0)$ = number of 0's in reference
$N_S(1)$ = number of 1's in sensed map line segment being correlated
$N_S(0)$ = number of 0's in sensed map line segment being correlated
$L = N_R(1) + N_R(0) = N_S(1) + N_S(0)$ = bit length of data reference
$\tau$ = displacement of the reference relative to the data matrix
$\theta$ = reference orientation of the reference
$n$ = an integer of at least unity The values of such function, as determined for selected combinations of data matrix positions and orientations, are then compared for determining that combination of position and orientation having a maximum value of the function $M(\tau, \theta)$ associated therewith.

Such correlation of a binary coded line of data with a binary coded data matrix for image matching purposes may be achieved with a minimum of data processing capacity and time. Accordingly, it is an object of the subject invention to provide improved apparatus and method for data correlation purposes.

It is another object to provide a data line correlator for correlation of a two dimensional data matrix with a one-dimensional data reference.

Another object is to provide a method of correlating a data line with a data matrix which is useful for map matching purposes.

These and other objects of the invention will become apparent from the following description, taken in conjunction with the accompanying drawings in which:

BRIEF DESCRIPTION OF THE DRAWINGS

In the figures, like reference characters refer to like elements.

DESCRIPTION OF THE PREFERRED EMBODIMENT

Figure 1:
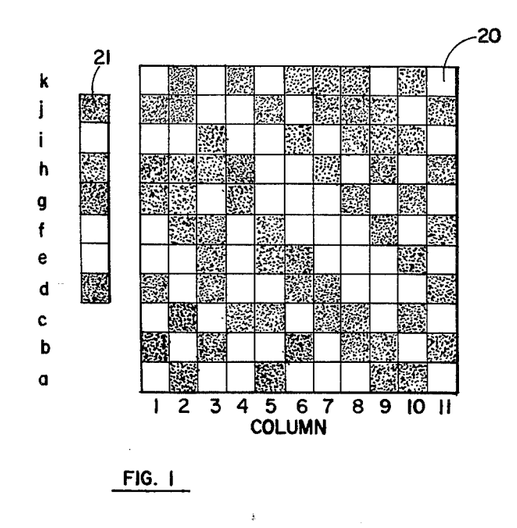
FIG. 1 is an illustration of a representative binary coded data matrix representing an image or map of interest and a binary coded data line source, to be correlated therewith.

Referring to FIG. 1, there is illustrated an exemplary binary-coded data matrix 20 (which may represent an image or map of interest) and a binary-coded data line source 21 of seven bits. Data matrix 20, as shown, is comprised of columns 1–11 and rows a–k of data bits, the columns being selected to be parallel to the orientation of data line source 21 for convenience in correlation therewith.

The process of correlation of line source 21 with matrix 20 involves the determination of which location within which column of matrix 20 a data line segment exists which provides a best match with data line source 21. From an inspection of the columns of matrix 20, it is to be observed that none of columns 2–11 include a sequential seven-bit portion having a line pattern which matches that of data line source 21. However, it is apparent that within column 1, bits d–j present a line pattern matching that of line source 21. In other words, the (four) ones at rows d, g, h, and j in column 1 match corresponding ones in the first, fourth, fifth and seventh bits of line source 21; while the (three) zeros at rows e, f, and i of column 1 match corresponding zeros in the second, third and sixth bits of line source 21, whereby all seven bits of the line source are matched. Such effort at a quantitative measure of such match, effected by counting the number of matching bits, is affected by the length or number of bits in the data line source. In other words, the quality of a match or near-match indicated by such quantitative result, may be disguised or obscured by the length of the line source employed. A longer word or line length may give a higher matching score or correlation measure, for example, for a near-match than a shorter word length may provide for an exact match. Accordingly, a method of correlation is preferred for which the effect of word length is normalized, while at the same time providing maximum sensitivity to or discrimination between matched and non-matched conditions, and which is little affected by the particular data style or pattern being correlated.

Fixed codes or line patterns have been evolved in the prior art for purposes of improved correlation. For example, it is known in the field of pulse compression radar that binary phase-coding of a transmitted pulse in terms of a preselected number of bits and arranged as a so-called Barker code, provides maximum phase-delay discrimination for improved range resolution, the resolution being limited by the bit or subpulse interval of the phase coding rather than by the pulsewidth itself. However, in a generalized image matching application wherein a randomly selected data line source is sought to be correlated with arbitrary ones of the data lines of a data matrix, such randomly occurring line source will not, in ordinary probability, resemble a Barker code or any other pulse compression code. A generalized discussion of correlation techniques is treated at pages 181 and 182 in *The International Dictionary of Applied Mathematics*, published by D. VanNostrand; Co., Inc, (1960); while application of autocorrelation techniques in the processing of coded radar video returns for target detection is described in U.S. Pat. No. 3,412,397 to N. T. Evans for Video Correlator and Automatic Detector for Pencil Beam Radar.

By means of applicant's discovery, a correlation technique has been evolved which is generally useful for an randomly occurring, binary-coded data line source, having a high degree of sensitivity or discrimination between matched and unmatched states, and which is normalized for, or desensitized to, the length of the code or data line source. In the application of such technique, the correlation coefficient $M(\tau)$ is determined for the correlation or "degree of match" of a binary-coded data line source having a preselected word length or number (L) of bits, with a like number of sequential bits or word length portion of a reference data matrix. The number of ones in the line source word length is designated as $N_S(1)$ and the number of zeros as $N_S(0)$, while the number of ones in the data matrix line portion (of length L) is designated as $N_R(1)$ and the number of zeros as $N_R(0)$. The number of matched ones in either of the data line source or data matrix line portion being correlated, is designated as $N(11)$. The correlation coefficient $M(\tau)$ for the correlation of the line source with a given position or portion $(\tau)$ in a selected line of the data matrix, may be represented as:

$$M(\tau) = \left[ \frac{LN(11) - N_R(1)N_S(1)}{\sqrt{N_S(1)N_{(S)}(0)N_R(1)N_S(0)}} \right]^n \quad (2)$$

where: $n =$ an integer at least as great as unity

Applying such correlation technique to the correlation of seven-bit data line source 21 with column 1 of data matrix 20 in FIG. 1, it is seen that for $n = 1$, and the matched position $(\tau = 4)$, the correlation $M(\tau = 4)$ is:

$$M(\tau = 4) = \frac{7 \times 4 - 4^2}{\sqrt{(4 \times 3)^2}} = \frac{28 - 16}{12} = 1.00$$

Figure 2:
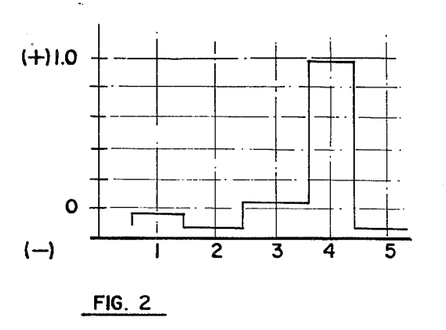
FIG. 2 is a graph of the correlation coefficient $M(\tau)$ obtained for the correlation of the data line source with various positions ($\tau$) in column one of the data matrix of FIG. 1, employing a selected algorithm.

A chart of the function $M(\tau)$ versus $\tau$ for column 1 of data matrix 20 is shown in FIG. 2, illustrating the relative sensitivity of such function to a matched condition.

It is to be appreciated that in a given correlation application, employing a given word length, the number L is a constant; the denominator factor $N_S(1)N_S(0)N_R(1)N_S(0)$ will vary as a function of the style or pattern of the data to be matched and the word length; while the factor $N_R(1)N_S(1)$ varies as a function of the data style and the word length. Hence, it is to be appreciated that the effect of word length on both the numerator and denominator tends to make the function $M(\tau)$ insensitive to word length, while the effect of the data style or coding of the data samples being correlated, upon both the factor $N_R(1)N_S(1)$ and the denominator of Equation (1), tends to normalize the effect of changes in coding or data style upon the function $M(\tau)$.

Figure 4:
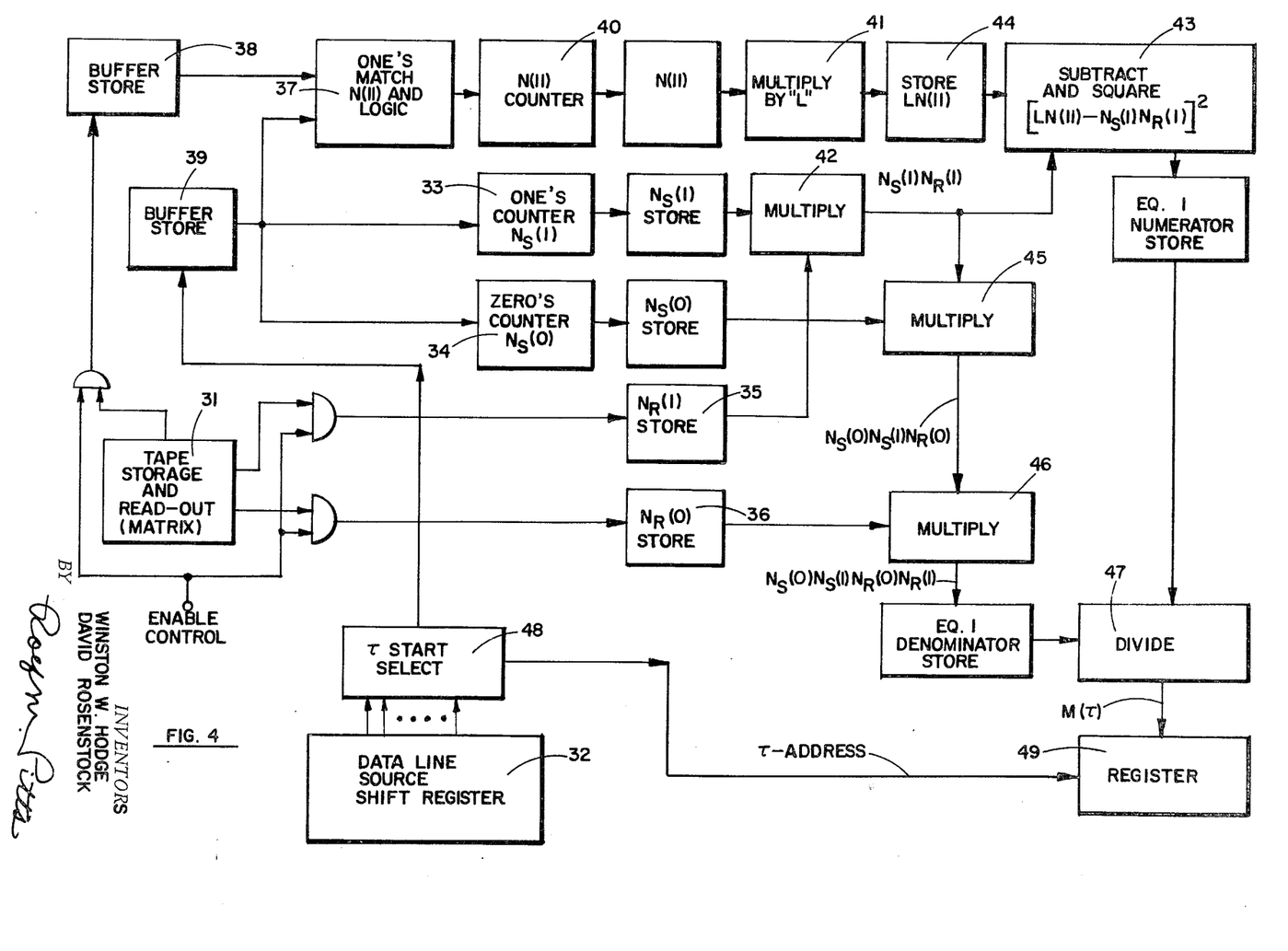
FIG. 4 is a block diagram of an exemplary mechanization of the correlator of FIG. 3.

Although the function $M(\tau)$ plotted in FIG. 2 has been computed from Equation (1) for $n = 1$, it may be preferable to employ $n = 2$, in order to avoid the square rooting operation indicated for the denominator of Equation (1), as shown more particularly in FIG. 4.

Figure 3:
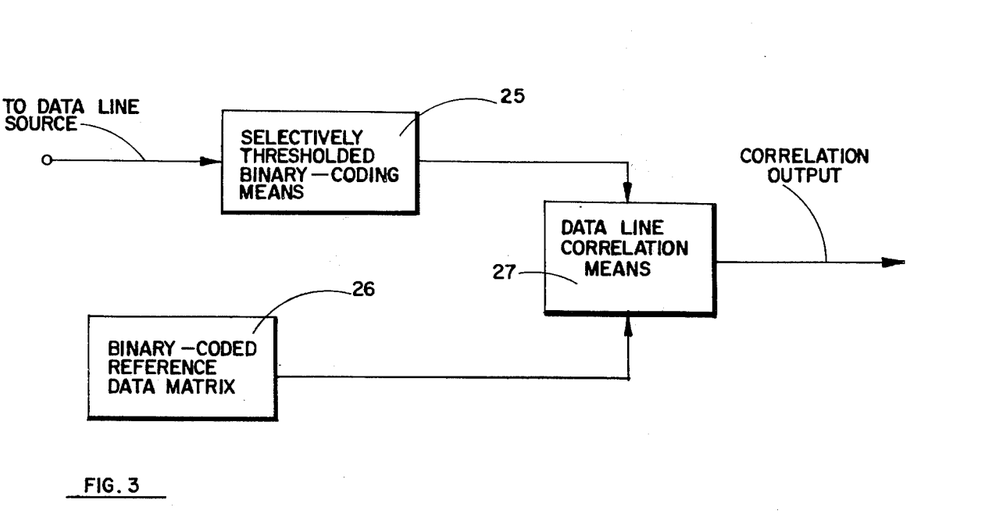
FIG. 3 is a block diagram of an exemplary system embodying one aspect of the concept of the invention.

Referring to FIG. 3, there is illustrated a block diagram of an exemplary system embodying one aspect of the invention. There is provided correlation means responsive to a binary coded data matrix 26 and a binary coded line source 25 for determining the correlation coefficient $M(\tau)$ for correlation of such line source with a selected portion of the data matrix, in accordance with the relationship of Equation (1). Such binary coded data matrix 26 may represent recorded or stored a priori data, while line source 25 may represent selectively thresholded and two-state limiting of a time serial signal.

The arrangement and cooperation of the exemplary correlation apparatus of FIG. 3 is shown in further detail in FIG. 4. In such detailed arrangement, a binary coded data matrix signal source is shown by means of tape storage and read-out means 31, while a binary coded time serial data line source (of at least L bits) is provided by a properly loaded shift register 32. The number of ones ($N_S(1)$) and zeros ($N_S(0)$) in a selected L-bit length of the time serial data line source are respectively counted by counters 33 and 34, respectively, and temporarily stored. The number of ones ($N_R(1)$) and zeros ($N_R(0)$) in the selected portion (of L bits) of the tape storage (corresponding to that portion of the data matrix to be correlated) is read into storage means 35 and 36 respectively by cooperation of an enable control or gating control input (the means for which is known per se). The number of matching ones ($N(11)$) is detected by coincidence logic means 37 responsively coupled to both the tape storage and data line shift register by means of buffer storage elements 38 and 39, and counted by a counter 40 responsively coupled to the output of logic means 37.

Separate control of tape storage 31 and data line shift register 32 is normally required, for several reasons. First, the stored or reference data represented by tape storage 31 is not necessarily in the same format as the data line in shift register 32. Also, separate addressing is required to determine (1) which reference data line in the stored data is to be employed for correlation purposes, as distinguished from (2) that portion or address ($\tau$) of successive addresses of the data line which are to be correlated with a given reference data line, in determining a best match. Accordingly, buffer storage elements 38 and 39 are used to convert the data to a common serial time format for comparison or matching purposes (e.g., correlation).

By means of a multiplier 41 the number $N(11)$, counted by counter 40, is scaled up or multiplied by the factor L which corresponds to the number of bits defining the word length of the data line source. Similarly, the numbers $N_S(1)$ and $N_R(1)$ are multiplied by multiplier means 42 to provide the product $N_S(1)N_R(1)$. The difference ($LN(11) - N_S(1)N_R(1)$), corresponding to that in the numerator of Equation (1), may then be determined by digital arithmetic means 43.

Because multiplier 41 merely scales up or multiplies the $N(11)$ output applied thereto, by a preselected factor L, whereas multiplier 42 has to wait for the generation of $N_S(1)$ and $N_R(1)$, temporary storage means 44 may need be interposed between arithmetic means 43 and multiplier 41, in the generation of the numerator term of Equation (1).

The denominator of Equation (1) is provided by the cooperation of two additional multipliers 45 and 46. Multiplier 45 is responsive to the number $N_S(0)$ (counted by counter 34) and the product $N_S(1)N_R(1)$ (provided by multiplier 42) to provide the product $N_S(0)N_S(1)N_R(1)$ as an input to multiplier 46. Multiplier 46 is further responsive to the number $N_R(0)$ in storage means 36 to provide the product, $N_S(0)N_S(1)N_R(0)N_R(1)$.

The ratio of the output of arithmetic means 43 divided by the output of multiplier 46, corresponding to the correlation coefficient $M(\tau)$ of Equation (1), is effected by division means 47. Arithmetic means 43 may also include means for squaring the numerator term, thus corresponding to the integer, 2, for the exponent, $n$, in Equation (1). In view of such squaring, in accordance with $n = 2$, then no square rooting calculation is required for the denominator term (provided by multiplier 46). Because a square root calculation requires more equipment and processing than does squaring (which is essentially a multiplication), a certain economy of design is effected in the correlator mechanization shown in FIG. 4.

The enable control gate input selectively limits the portion of the reference or stored data matrix which is read-out for correlation purposes (i.e., addresses a selected data reference of L bits), while the cooperation of start/select means 48 selectively controls readout of data line register 32 for selection of that portion of L bits (i.e., which $\tau$ position) of the data line to be utilized for such correlation. Start/select means 48 also cooperates with an output register 49 (which is responsively coupled to divider 47) for indicating which address $\tau$ is associated with a given message $M(\tau)$.

A data line match, as indicated by that address $\tau$ associated with a maximum value of $M(\tau)$, may then be determined by logic means responsive to the associated values of $M(\tau)$ associated with successive ones for $\tau$. The construction arrangement and cooperation of means for determining that word or code associated with a maximum correlation value from among a plurality of correlation values, is known in the digital equipment art, as indicated for example by U.S. Pat. No. 3,237,160 issued to M. E. Mitchell for Semiconductor Multiple-Word Correlator. Accordingly, such output stage is shown in FIG. 4 in block form only for convenience in exposition.

The construction, arrangement and cooperation of the computing elements of FIG. 4 are well known in the art and each may be comprised of separate digital means for effecting the associated arithmetic operation, or such elements may comprise common digital equipment appropriately time-shared. A description of such an integrated computing arrangment is described, for example, U.S. Pat. No. 3,237,168 issued to T. M. Hertz for Instruction Sequence Control for a Digital Computer. Accordingly, the arrangement of FIG. 4 is shown in block form only for convenience in exposition.

One application of interest in the utilization of the line correlation of FIGS. 3 and 4 is radar map matching for terminal guidance purposes. In such application, the data of a topographic survey map is processed as a binary coded matrix to depict only expected "hard" targets, in the manner shown in FIG. 1. Then, the radar receiver video data from a single "look" in azimuth or selected antenna beamwidth is subjected to binary coding, and the coded receiver data matched with the binary-coded map. In such matching process, the radar data line is sought to be matched with a data column or data line oriented parallel to the azimuth of the radar look direction and which lies through a target area of interest. Matching is sought in two ways: by varying or perturbing the binary bit position, $\tau$, (corresponding to a change in range along the azimuth line of interest)

and by varying or perturbing the azimuth, $\theta$, of the line of interest, and then determining that combination of $\tau$, $\theta$, for which the correlation coefficient $M(\tau, \theta)$, determined by the relationship of Equation (1), is a maximum. The geometry of such technique is illustrated in FIG. 5.

Certain navigation data for a technical guidance mode may be achieved by means of a conventional plan position indicator (PPI) display. However, where a high resolution radar, such as that described in U.S. application Ser. No. 686,113 filed Nov. 28, 1967 by C. L. Vehrs, Jr., assignor to North American Rockwell Corporation, assignee of the subject invention, is employed as the ground mapping sensor in order to assure the "breaking out" or distinguishing of a discrete non-moving target of interest from amid a clutter background, the density of displayed data elements to be correlated with a reference map may be so great as to readily saturate the ability of a human operator to quickly perform such correlation or possible result in confusion of the human operator. In other words, no real tactical advantage for terminal guidance purpose is achieved from such high resolution radar display, under the circumstances of operator confusion by the data density. Accordingly, automatic handling and correlation means is required in order to effect optimum utilization of such high resolution radar data.

Figure 5:
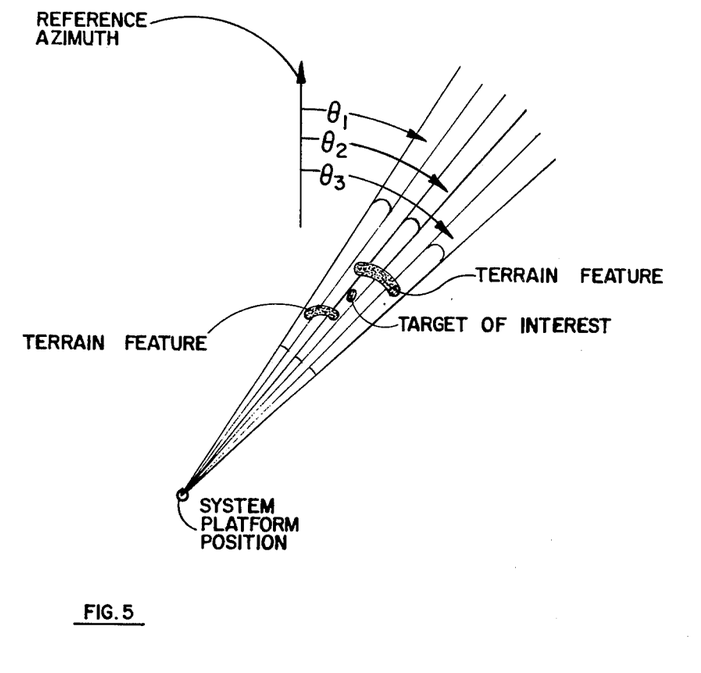
FIG. 5 illustrates the geometry of an image matching or correlation problem to which the concept of the invention may be applied.

Referring to FIG. 5, there is illustrated the geometry of an exemplary situation in which the concept of the invention may be employed. There is illustrated a map of a target or terminal guidance reference of interest amid two terrain features not of interest, the target being distinguishable from amid such terrain features by means of the improved resolution of a mapping radar or system sensor, the surveillance of which is indicated by the beamwidth positions superimposed on the map of FIG. 5. The human operator will ordinarily be able to lay a target cursor upon a PPI display (containing a target of interest) with at least a minimum degree of accuracy (or, in the case of an automatically guided vehicle, the vehicle position relative to the ground point of interest will be known with some minimum degree of accuracy). Be perturbing the reference map relative to the radar data line in range $\tau$ and azimuth $\theta$, and performing the correlation indicated by Equation (2) for each position or set of $(\tau, \theta)$, the position of the radar system platform (or aircraft) may be determined relative to the map as that position $(\tau, \theta)$ having the maximum value for the correlation coefficient $M(\tau, \theta)$, as shown in FIG. 5. In so perturbing the reference map relative in azimuth relative to the radar data line, however, it is necessary to reconstruct or reform the reference data matrix in rows and columns respectively orthogonal and parallel to the azimuth or bearing of the radar look angle or sample beamwidth associated with the sample data line sensed by the radar.

Further, the alternate data column (of the data matrix) thus presented for correlation may not include or lie upon the target of interest nor would the resulting correlation coefficient necessarily indicate in which direction (relative to such data column) the target lies. Moreover, the correlation process would be limited to correlation of a single sensed data line (a binary coded range trace signal) which, itself, may not include the actual target of interest. Accordingly, the resultant correlation would be of limited significance.

Figure 6:
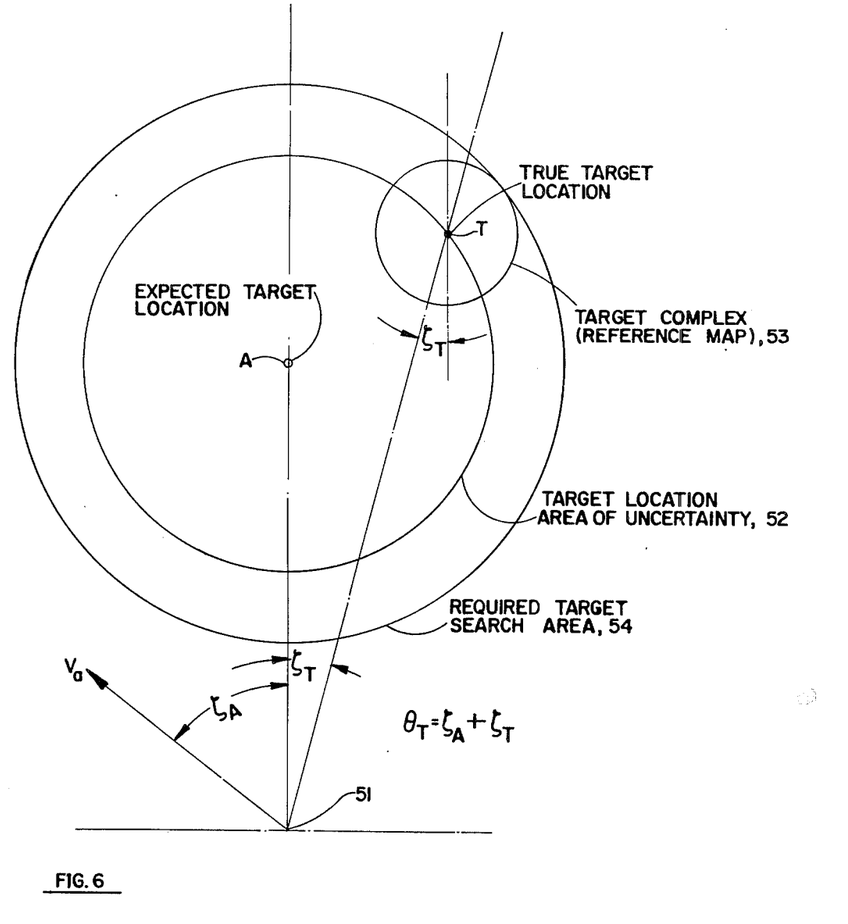
FIGS. 6, 7A-B and 8 illustrate various aspects of a preferred technique for utilizing a line correlator.
Figure 7A:
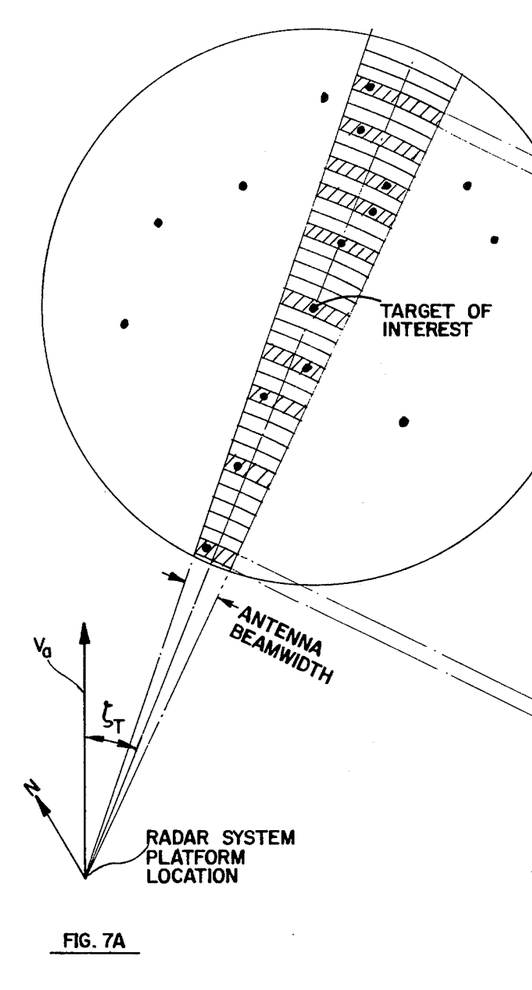
Figure 7B:
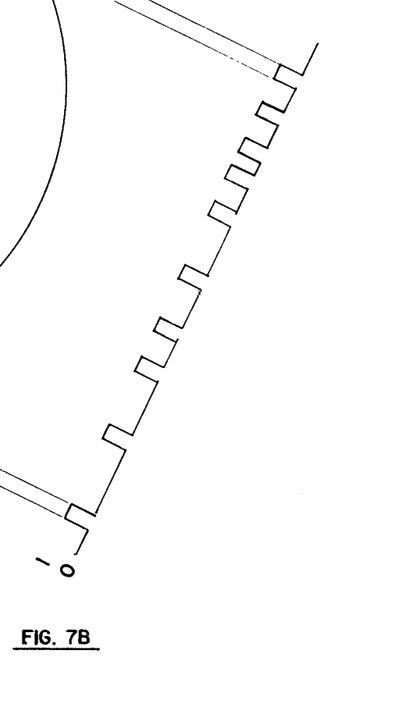
Figure 8:
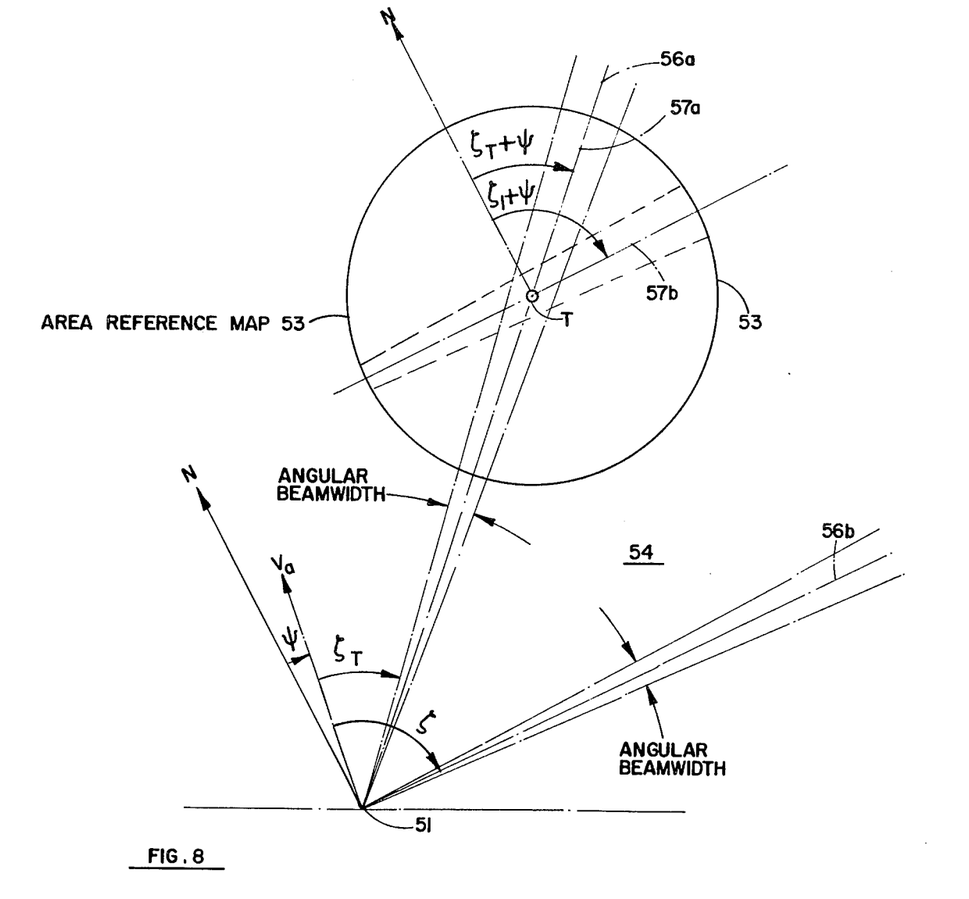

A technique for increased certainty of correlating a sensed target of interest with a reference map thereof while reducing the amount of data to be processed, is shown in FIGS. 6, 7, and 8. Referring to FIG. 6, there is illustrated the geometry of a representative target location problem which is solved by means of the concept of the invention. Point 51 represents the position of a platform or airborne vehicle on which a ranging sensor or radar system (utilizing the invention) is mounted, point A represents an expected location of a target of interest (relative to the platform) and center of an area 52 of uncertainty in target location (due to navigation errors, etc.); point T represents the true location of the target (relative to the actual position 51 of the system platform) and is shown for a worst case as being located at the edge of the area of uncertainty 52. Where the target reference is defined as a data image located within a selected field of view or target complex 53, then the required search area 54 to be searched by the sensor (from position 51) is increased beyond the area of uncertainty 52 by the radius of the target complex area 53. The diameter associated with such radius corresponds to the word length L in Equation (1).

If the sensor is pointing in the direction $\delta_T$ of the true location of target T, the sensor data line will lie upon the target T and upon a similarly oriented reference data line in the target complex area 53. A preselectively threshold video range trace signal response to targets occurring within the antenna beamwidth may then be binary coded, as indicated in FIG. 7a and 7b, and correlated as a function of range with the corresponding binary coded reference map line. In other words, a binary coded reference data line running through a selected target T and oriented at an azimuth $\delta_T$ relative to a reference direction (corresponding to the expected target direction line 55) can be successfully correlated with the binary coded range trace video signal for such direction, $\delta_T$.

If, however, the radar or sensor is not pointing in the direction $\delta_T$ at the target T, it is necessary to scan the search area 54 in search of the target, and determine the correlation coefficients $M(\tau, \theta)$ for the sensed data line of each sampled azimuth, $\theta = \delta_A + \delta$, with reference target data line associated with azimuth. Such technique may be more clearly appreciated from a consideration of FIG. 8.

Referring to FIG. 8, there is illustrated the position 51 of the sensor platform relative to the actual location of a target complex of interest. Also shown are the sensed data lines 56a and 56b for several azimuth orientations of an azimuthally scanned beamwidth for the directionally ranging sensor at position 51, together with the associated reference map strips or reference data lines 57a and 51b at such azimuth orientations in the target complex reference map 53 and centered over the target of interest, $\tau$, like subscripts referring to like azimuths and identifying a corresponding set of a reference map data line and sensed data line to be correlated. For example, sensed line 56a and reference data line 57a represent a set of data lines (for a given direction $\theta_a$) which are to be correlated in range, $\tau$, for determination of the correlation coefficient $M(\tau, \theta_a)$.

In normal operation of the azimuthally scanned directionally ranging sensor, the entire search area 54 (in FIG. 6) is searched by means of the scanning mode of the sensor, whereby at least one range trace signal (within a scanning interval) must include the specific target of interest. The range trace signal for each sensed data line 56 is correlated with stored reference data line 57 which includes target T and having the same azimuthal orientation through the target complex area or reference map 53 of FIGS. 6 and 8. Thus, in scanning the search area 54 of FIG. 6, the sensed data line for each direction $\theta$ is correlated as a function of range $\tau$ with a mutually exclusive reference data line which includes the specific target of interest. The determination of the maximum value for the correlation coefficient $M(\tau, \theta)$ for the data sets of $(\tau, \theta)$ correlated is deemed indicative of a match, and the coordinates ($\tau$ and $\theta$) thereof are deemed indicative of those of the target of interest relative to the sensor platform position and velocity vector (or reference heading).

It is to be appreciated that the degree of correlation (or value, $M(\tau, \theta)$ will be very low for other than a near fit along the proper azimuth. Thus, appropriate thresholding of the results of the correlation computation method may be employed to avoid the necessity of storing trivial computed values of $M(\tau)$, whereby the amount of memory or storage capacity required may be reduced.

Hence, it is to be appreciated that by such procedure a reference map of the entire search area need not be compared with the sensed data of the entire search area, and that problems of map registration are substantially simplified.

Figure 9:
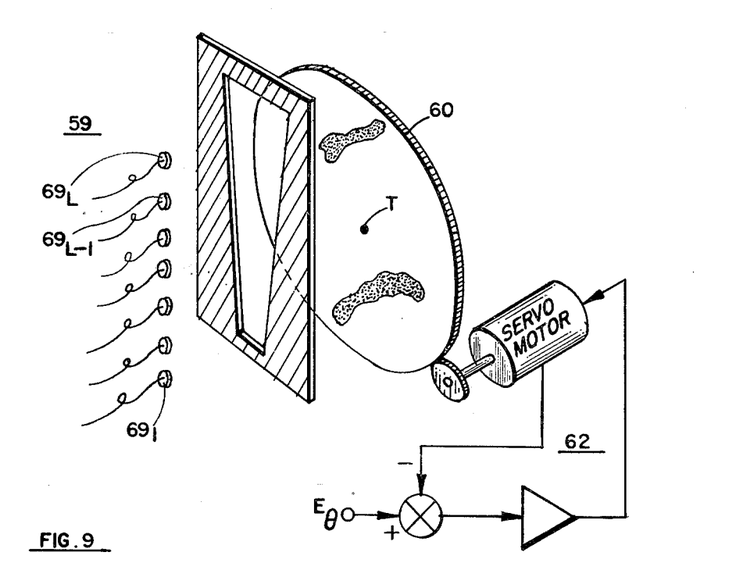
FIG. 9 illustrates a schematic arrangement for effecting rotation of the coordinate system of a matrix.

Although the forming of the reference map into a matrix of rows and columns of binary coded data elements for use with the technique of FIG. 8 requires the rotation of the data matrix or reconstruction of the columns to different azimuthal orientations to be correlated, such rotation of the matrix coordinate system may be easily accomplished. One method, as illustrated in FIG. 9, employs a masked photo-diode matrix 59 and an illuminated transparency 60 which corresponds to the reference map 53 of interest and having the target of interest centered therein. The photo diode matrix 59 may include a lineal array of diodes $69_1 - 69_L$ extending across a diameter of the face of the transparency, the number of evenly spaced diodes of the array corresponding to the word length L of Equation (1). A mask 61 may be interposed between transparency 60 and diode matrix 69 to mask-out portions of the illuminated transparency, the transmitted portion thereof corresponding generally to the terrain-illuminated beamwidth of the directionally-ranging azimuthally scanning sensor. By relative rotation of the reference map transparency 60 about the target T and relative to the photodiode matrix 59, a selected azimuthal reference data line is resolved into L data elements as outputs of the photodiode array 59. Such rotation of transparency 60 may be effected by servo means 62 responsive to a signal $E_\theta$ indicative of the azimuth direction of the directionally ranging azimuthally scanning sensor system. Other means may be employed, such as memory registers or reference data lines of the reference map 53 and corresponding to different azimuth directions, each including the target of interest T and being addressed by the associated azimuth, $\theta$. Also, matrix transformation computing means may be employed for computing new matrix coordinates $x'$ and $y'$ for the rotation angle $\theta$, in accordance with the relationship:

$$x' = x \cos \theta - y \sin \theta \qquad (3)$$

$$y' = x \sin \theta + y \cos \theta$$

Further, if desired, wedge extraction transformation (of the rotation transformed matrix) may be effected for matching the width of the reference data line to the antenna beamwidth $\Delta\theta$ associated with the width of the sensed data line as a function of range, $r$:

$$x'_i = 2r_i \tan \Delta\theta \qquad (4)$$

where the subscript $i$ corresponds to a range bin or bit of interest.

Figure 10:
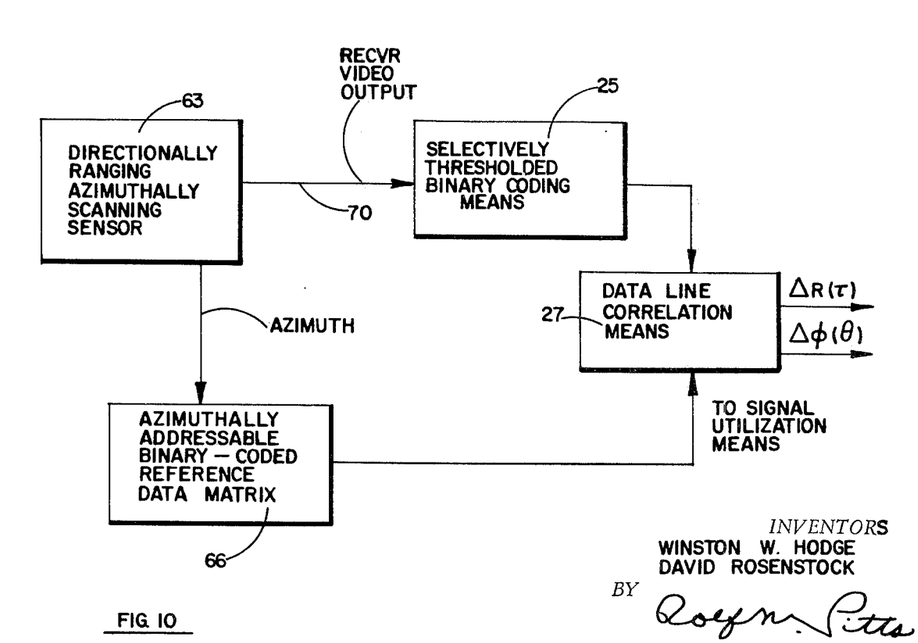
FIG. 10 is a block diagram of a system in which the concepts of the invention may be advantageously employed.

Such azimuthally addressable data matrix (of FIG. 9) for obtaining a reference data line or word of L bits is shown in cooperation with a directionally-ranging azimuthally scanning sensor, in accordance with the concept of the invention, in FIG. 10.

Referring to FIG. 10, there is illustrated binary coding means 25 and correlation means 27, corresponding to like reference elements in FIG. 3. In the block diagram arrangement of FIG. 10, the video receiver output of a directionally ranging azimuthally scanning sensor 63, such as a radar, is fed to binary coding means 25 to obtain binary coding of such sensed data line signal, the binary-coded sensed data line being fed as a first input to data line correlation means 27. A second or reference binary coded data line input to correlation means 17 is provided by an azimuthally addressable reference data matrix 66, functionally corresponding to the arrangement of FIG. 9, the azimuth address thereto being provided by an azimuth pickoff or the like of the azimuthally scanning radar 63.

Date line correlation means 27 cooperates with radar 63 and matrix 66 to determine the rage and direction address ($\tau, \theta$) associated with the maximum value of the correlation coefficient $M(\tau, \theta)$ in accordance with the technique described in connection with the description of FIG. 8. Such range and direction information may then be transformed (by suitable means not shown) into the coordinate system employed by an on-board (automatic) navigator and compared with the position data provided by such navigator for checkpointing or updating such navigator performance. Such data may also be used in a terminal guidance mode, a comparison of the direction of the target with the velocity vector of the airborne system platform providing steering signals and the distance or range to the target being useful for estimating "time-to-go". Such target range and direction information may also be used in a manned vehicle for the generation of target cursors or markers in a PPI display, whereby the target may be more precisely discerned relative to displayed terrain prominences sensed by the radar.

It is understood throughout the preceding description that the scale of the reference map employed must be appropriately selected or adjusted, in effecting a binary-coded reference data line, such that L bits of such line corresponds to a like spatial dimension or incremental range ($\Delta R$) as does L bits of the sensed data or radar range trace signal.

In a practical reduction to practice, it has been determined that a feasible number of bits for L may be 100. Also, although discrete changes of azimuth as small as 0.5 degree may be employed, the use of a larger increment of 5.0 degrees has little degradation effect upon the usefulness of the technique. In other words, in the cooperation of such correlation technique with a high resolution radar, the effective resolution is little affected by usual antenna beamwidth.

Accordingly, there has been described an improved data-correlation system employing a one-dimensional data matrix or data line correlator which is of particular utility in image matching for automatic navigation purposes.

Although the invention has been described and illustrated in detail, it is to be clearly understood that the same is by way of illustration and example only and is not to be taken by way of limitation, the spirit and scope of this invention being limited by the terms of the appended claims.

We claim:

1. A line correlator for correlation of a binary coded two-dimensional data matrix of interest with a binary coded one-dimensional data reference and including means for determining the correlation coefficient $M(\tau,\theta)$ of the correlation of said data matrix and said data reference in accordance with the following relationship:

$$M(\tau, \theta) = \left[ \frac{LN(11) - N_R(1)N_S(1)}{[N_S(1)N_S(0)N_R(1)N_R(0)]^{1/2}} \right]^n$$

$N(11)$ = number of matched 1's
$N_R(1)$ = number of 1's in reference
$N_R(0)$ = number of 0's in reference
$N_S(1)$ = number of 1's in sensed map line segment being correlated
$N_S(0)$ = number of 0's in sensed map line segment being correlated
$L = N_R(1) + N_R(0) = N_S(1) + N_S(0)$ = bit length of data reference
$\tau$ = displacement (in bits) of the data reference relative to the data matrix
$\theta$ = reference orientation of the data reference relative to the data matrix
$n$ = an integer of at least unity said device further including means responsive to the function $M(\tau, \theta)$ for a number of selected combinations of data matrix positions $(\tau)$ and orientations $(\theta)$ for determining that combination of position and orientation having a maximum value of the function $M(\tau, \theta)$ associated therewith.

2. A line correlator for correlation of a binary coded two-dimensional data matrix of interest with a binary coded one-dimensional data reference and including means for determining the correlation coefficient $M(\tau, \theta)$ of the correlation of said data matrix and said data reference in accordance with the following relationship:

$$M(\tau, \theta) = \left[ \frac{LN(11) - N_R(1)N_S(1)}{[N_S(1)N_S(0)N_R(1)N_R(0)]^{1/2}} \right]^n$$

$N(11)$ = number of matched 1's
$N_R(1)$ = number of 1's in reference
$N_R(0)$ = number of 0's in reference
$N_S(1)$ = number of 1's in sensed map line segment being correlated
$N_S(0)$ = number of 0's in sensed map line segment being correlated
$L = N_R(1) + N_R(0) = N_S(1) + N_S(0)$ = bit length of data reference
$\tau$ = displacement (in bits) of the data reference relative to the data matrix
$\theta$ = reference orientation of the data reference relative to the data matrix
$n$ = an integer of at least unity said device further including means responsive to the function $M(\tau, \theta)$ for a number of successive data matrix orientations $(\theta)$ for determining that orientation having a maximum value of the function associated therewith.

3. A line correlator for correlation of a binary coded one-dimensional data source of interest with a binary coded one-dimensional data reference, including means for determining the correlation coefficient $M(\tau)$ of the correlation of said data source of interest with said reference data in accordance with the following relationship:

$$M(\tau) = \left[ \frac{LN(11) - N_R(1)N_S(1)}{\sqrt{N_S(1)N_S(0)N_R(1)N_R(0)}} \right]^n$$

where:
$N(11)$ = number of matched 1's
$N_R(1)$ = number of 1's in reference
$N_R(0)$ = number of 0's in reference
$N_S(1)$ = number of 1's in sensed map line segment being correlated
$L = N_R(1) + N_R(0) = N_S(1) + N_S(0)$ = bit length of data reference
= displacement of the reference relative to the data matrix
$n \geq 1$ and further including means responsive to the function $M(\tau)$ for a number of successive data matrix position $(\tau)$ for determining that position having a maximum value of the function $M(\tau)$ associated therewith.

4. A method for determining that portion of a data image which best matches a reference image, comprising the steps of
sampling said data image in different directions $\theta$ from a common vantage point to obtain a series of binary coded data lines;
sampling said reference image at like directions as said sampled data image to obtain binary coded reference data lines;
correlating for each sampled direction $\theta$ the data line and reference data line obtained for such direction to determine a better match condition $(\tau)$ for such direction; and
determining that direction $(\theta)$ and condition $(\tau)$ for which the best match occurs,
said step of correlating further comprising the steps of
determining the product $(LN(11))$ of the number $N(11)$ of matching ones of said data line and said reference data, multiplied by the bit length L of said binary coded reference data line;
determining the product $N_R(1)N_S(1)$ of the number of ones $N_R(1)$ in the reference data line and the number of ones $N_S(1)$ in that portion of the data line being correlated; and
determining the ratio of the difference $LN(11) - N_R(1)N_S(1)$ to the product $N_S(1)N_S(0)N_R(1)N_S(1)$,
where:
$N_R(0)$ = number of zeros in the binary coded reference data line
$N_S(0)$ = number of zeros in that position of the binary coded data line being correlated.

5. In a map matching radar, means for determining that portion of a radar data image which best matches a reference image, comprising
- means for sampling said data image in different directions $\theta$ from a common vantage point to obtain a series of binary coded data lines;
- means for sampling said reference image at like directions as said sampled data image to obtain binary coded reference data lines;
- means for correlating for each sampled direction $\theta$ the data line and reference data lines obtained for such direction to determine a better match condition ($\tau$) for such direction; and
- means for determining that direction ($\theta$) and condition ($\tau$) for which the best match occurs;

said means for correlating comprising
- means for determining the product (LN(11)) of the number N(11) of matching ones of said data line and said reference data, multiplied by the bit length L of said binary coded reference data line;
- means for determining the product $N_R(1)N_S(1)$ of the number of ones $N_R(11)$ in the reference data line and the number of ones $N_S(1)$ in that portion of the data line being correlated; and
- means for determining the ratio of the difference LN(11) - $N_R(1)N_S(1)$ to the product $N_S(1)N_S(0)N_R(1)N_S(1)$, where:
$N_R(0)$ = number of zeros in the binary coded reference data line
$N_S(0)$ = number of zeros in that portion of the binary coded data line being correlated.

6. Correlation apparatus for determination of the degree of correlation $M(\tau)$ of a binary coded one-dimensional data source of interest with a binary-coded one-dimensional data reference, comprising
- means for determining the product (LN(11)) of the number N(11) of matching one's of said data source and data reference, multiplied by the bit length L of said binary coded data reference,
- means for determining the product $N_R(1)N_S(1)$ of the number of one's $N_R(1)$ in the data reference and the number of ones $N_S(1)$ in that portion of the data source of interest being correlated;
- means responsive to said first and second means for determining a preselected function of the ratio of the difference, LN(11) - $N_R(1)N_S(1)$, to the product $N_S(1)N_S(0)N_R(1)N_S(1)$, where:
$N_R(0)$ = number of zero's in the binary coded data reference
$N_S(0)$ = number of zero's in that portion of the binary coded data source being correlated.

7. A correlation method for determination of the degree of correlation $M(\tau)$ of a binary coded one-dimensional data source of interest with a binary-coded one-dimensional data reference comprising the steps of
- determining the product (LN(11)) of the number N(11) of matching one's of said data source and data reference, multiplied by the bit length L of said binary coded data reference;
- determining the product $N_R(1)N_S(1)$ of the number of one's $N_R(11)$ in the data reference and the number of one's $N_S(1)$ in that portion of the data source of interest being correlated; and
- determining a preselected function of the ratio of the difference LN(11) - $N_R(1)N_S(1)$ to the product $N_S(1)N_S(0)N_R(1)N_S(1)$, where:
$N_R(0)$ = number of zero's in the binary coded data reference
$N_S(0)$ = number of zero's in that portion of the binary coded data source being correlated.

8. The method of claim 7 in which there is further included the step of determining for a number of successive data matrix positions ($\tau$) that position having a maximum value of the function $M(\tau)$ associated therewith.

9. The method of claim 7 in which there is included the further step of determining for a number of successive data matrix orientations ($\theta$) that orientation having a maximum value of the function $M(\tau, \theta)$ associated therewith.

10. The method of claim 7 in which there is included the further step of determining for a number of selected combinations of data matrix positions ($\tau$) and orientations ($\theta$) for determining that combination of position and orientation having a maximum value of the function $M(\tau, \theta)$ associated therewith.

11. In a map matching directional radar, means for determining that lineal strip portion of a radar data image which best matches a lineal strip of a reference image, comprising
- means for radial strip sampling said data image in successive directions $\theta$ from a common vantage point to obtain a series of binary coded data lines;
- means for strip sampling said reference image at like directions as said sampled data image to obtain binary coded reference data lines;
- means for correlating for each sampled direction $\theta$ the data line and reference data line for successive conditions ($\tau$) obtained for such direction to determine a better match condition for such direction; and
- means for determining that direction ($\theta$) and condition ($\tau$) for which the best match occurs.

* * * * *